Figure 5:
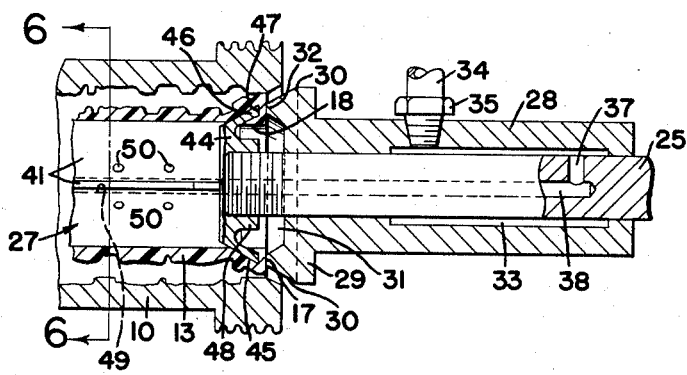

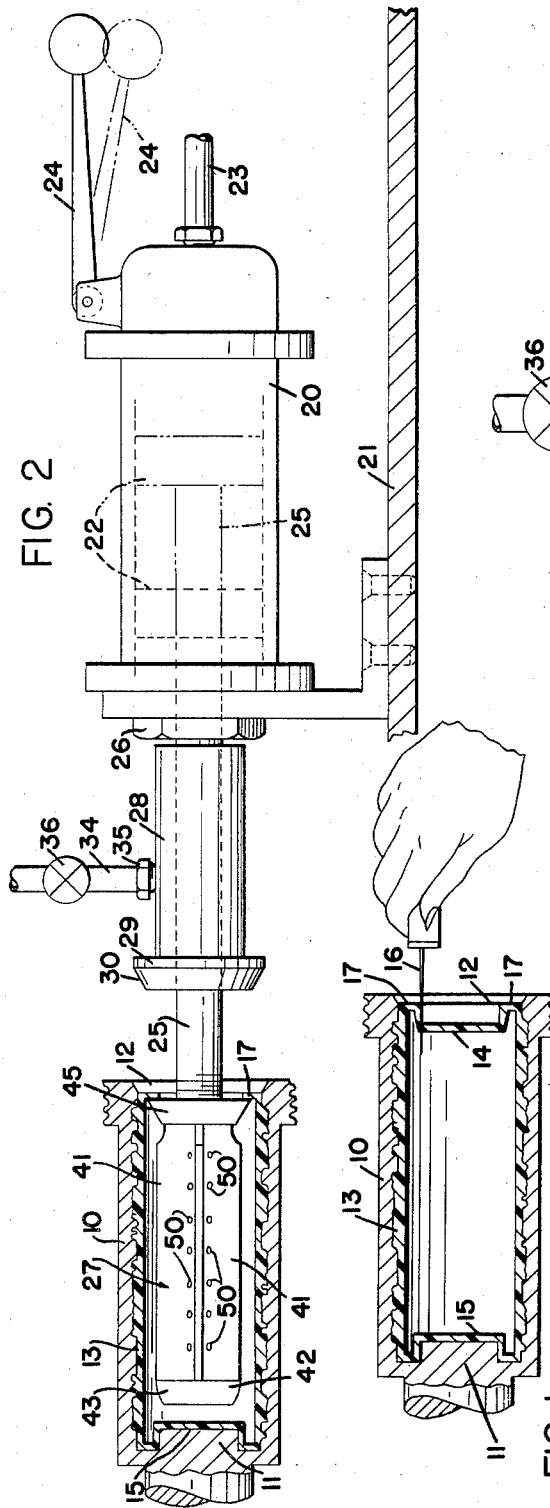

Oct. 21, 1958  P. REKETTYE  2,856,632
PROCESS AND APPARATUS FOR STRIPPING
VINYL RESINS FROM MOLDS
Filed Feb. 19, 1954  2 Sheets-Sheet 2

INVENTOR.
PAUL REKETTYE
BY *Ely, Frye & Hamilton*
ATTORNEYS

United States Patent Office 2,856,632
Patented Oct. 21, 1958

2,856,632

PROCESS AND APPARATUS FOR STRIPPING VINYL RESINS FROM MOLDS

Paul Rekettye, Akron, Ohio, assignor to The Sun Rubber Company, Barberton, Ohio, a corporation of Ohio Application February 19, 1954, Serial No. 411,355

14 Claims. (Cl. 18—2)

This invention relates to a process and apparatus for stripping and removing from substantially one-piece, non-sectional molds, articles which are molded from plastisols such as compounds of vinyl resins and plasticizers, and from other resinous materials.

The invention was perfected for use in removing from molds, paint rollers molded from plastisols, but it will be apparent that the invention also may be used with other molded objects and with other resinous materials. These paint rollers are made with highly decorative raised patterns which must be produced without a flaw or blemish for, if not, the flaw will be repeated over and over again as the roller is moved over a freshly painted surface. Hence, when these paint rollers are molded in a conventional two part sectional mold, when the mold sections are separated to remove the rollers, the parting line of the mold sections leaves unsightly flash lines on the rollers which, even when trimmed down, spoil the effect of the original design or pattern.

It has, therefore, been found desirable in the case of a paint roller, to use a mold body in the form of an unbroken non-sectional cylinder with the desired design cut in intaglio on its inner surface. In using such cylinder, however, it has been found difficult to remove the molded roller from inside the cylinder without damage to the design on the outer surface of the roller, and one of the objects of this invention is to provide a novel process for quickly and satisfactorily stripping and removing the molded roller from the inner wall of the cylinder with the design on the roller undamaged.

Another object is to provide novel apparatus for efficiently stripping the molded roller from the cylinder wall without damage to the roller or its surface design.

A further object is to provide a novel process and apparatus which takes advantage of the flexible characteristic of the resinous material, and by means of a vacuum created within the roller itself, causes the annular wall of the roller to move inwardly free of engagement with the mold cylinder wall, from which latter position the cylindrical mold may be readily pulled away from the roller.

A further object is to provide a novel process and apparatus whereby after a paint roller or the like has been molded in an unbroken cylindrical mold, one end of the mold is opened, and a portion of the adjacent end wall of the molded roller is cut away to permit access to the interior of the roller. Then the mold and the roller therein are mounted upon a specially shaped mandrel having vacuum means associated therewith, with a space being left between the outer surface of said mandrel and the inner surface of said roller which is greater than the greatest thickness of the roller wall. After the roller is in air-sealed relation with the mandrel, a vacuum is created within the roller, causing the annular roller wall to be freed of engagement with the mold wall and to engage the outer surface of the mandrel. Thereafter, with the vacuum maintained in the roller, the mold is pulled from around the roller.

Other objects and advantages will become apparent from the following description taken in conjunction with the accompanying drawings.

Figure 4:
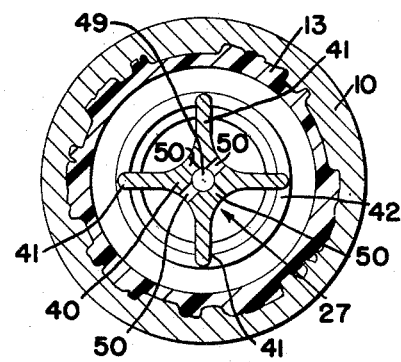
Figure 6:
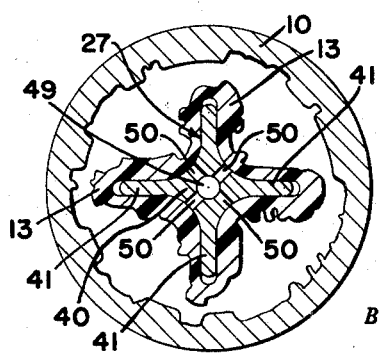

In the drawings:

Fig. 1 is a longitudinal section through a non-sectional, unbroken, cylindrical mold, showing a paint roller which has been molded therein with a raised decorative outer surface still in engagement with the mold wall, with one end of the mold cylinder being open to permit a cutting tool to remove an end wall of the roller, Fig. 2 is a similar section showing the mold and roller mounted on a piston operated mandrel having a vacuum line associated therewith, Fig. 3 is an enlarged detailed section through the mold and mandrel before they have been moved to air sealing position, Fig. 4 is a vertical section taken substantially on line 4—4 of Fig. 3, Fig. 5 is a fragmentary section showing the air seal between the mandrel and roller, and showing the latter moved from engagement with the mold wall into engagement with the outer surface of the mandrel, and Fig. 6 is a vertical section taken substantially on line 6—6 of Fig. 5.

Referring to Fig. 1 of the drawings, the numeral 10 designates an unbroken cylindrical, non-sectional, non-porous mold, which in this instance is permanently closed at one end 11, while its opposite end 12 is adapted, when the mold is in use, to be closed by a removable cap (not shown), having the same general shape as the closed end 11 of the mold. Secured to the inside surface of the mold 10 is an annular plastisol paint roller 13, the outer periphery of which has a highly decorative raised pattern formed thereon during the molding process by virtue of the pattern cut in intaglio on the inner annular wall of mold 10. The problem at hand is to remove the molded paint roller from the mold without damaging the annular wall of the roller or its surface pattern.

While the instant process and apparatus for removing the roller from the mold was developed for use with rollers that have been formed by the basic vinyl resin casting apparatus and method of Martin et al. Patent No. 2,629,131 and Molitor Patent No. 2,629,134, both granted February 24, 1953, which involve rotating the mold in a multiplicity of planes to distribute the plastisol as a layer over the entire inner surface of the mold, the roller could be formed in the cylindrical mold in other ways. In fact, it is not important to this invention what process is used in molding the roller within the cylindrical mold.

The present invention is utilized after the roller 13 has been completely molded in the mold 10 and the latter is cooled down sufficiently to be handled by an operator. The roller is formed from a plastisol, such as a compound of vinyl resins and a plasticizer, although other resinous materials could be used. When molded, the roller 13 comprises a hollow, one-piece body which is annular in transverse cross-section and has integral end walls 14 and 15, with the material of the roller being flexible and of a rubber-like consistency.

The mold closure cap (not shown) is removed from the cylinder to open end 12 thereof and expose end wall 14 of the roller. An operator then takes a suitable cutting tool, such as a knife 16, and cuts out the central portion of wall 14, leaving a short inwardly extending integral flange 17 on one end of the roller, with a short lip portion 18 extending longitudinally from said flange, which lip portion may be feathered toward its inner end, as indicated at 19 (Fig. 3).

Referring to Fig. 2, a conventional two-way air cylinder 20 is suitably mounted and secured upon a table 21 or the like, and a piston 22 is movable in the cylinder by compressed air received through line 23 under control of a conventional valve (not shown), which is operated by hand lever 24 to move the piston forwardly and rearwardly in the cylinder. Piston 22 carries a piston rod 25 which extends outwardly of the cylinder through a conventional packing gland 26, and on its opposite end is threaded a mandrel, indicated in its entirety by the numeral 27.

Mounted for limited sliding movement on rod 25 is an elongated sleeve 28 having an enlarged head 29, with a tapered portion 30 decreasing in diameter toward its front face, and with a portion of its front face cut away as at 31, to provide an annular clamping area 32 on the front of the sleeve, for a purpose to be described. Intermediate its ends, sleeve 28 has an enlarged bore that forms an annular chamber 33 surrounding a portion of rod 25, and threaded into the sleeve, in communication with chamber 33 is one end of a vacuum line 34, which may be locked in place by a nut 35. A conventional valve 36 in line 34 may be operated to create a vacuum under conditions to be described.

As shown in Figs. 3 and 5, the piston rod 25 has a radial passage 37, the outer end of which is always in communication with chamber 33 regardless of the position of sleeve 28 with respect to rod 25. The inner end of passage 37 communicates with one end of a central longitudinal passageway 38 formed in rod 25 and extending from passage 37 to the front end of rod 25.

The mandrel 27 comprises, in this instance, a body portion which is star-like in transverse cross-section, having a relatively thick hub area 40, with a plurality (in this instance four) of integral, radial arms or vanes 41 equidistantly spaced around the hub. A cup-like head ring 42 is welded or otherwise suitably secured to the front end of the body portion and has a slightly rounded front surface 43. A generally annular tail plate 44 is also suitably secured to the rear end of the body portion, and has a tapered outer surface 45 increasing in diameter toward its rear face, a cut-out area 46 on its rear face which provides an annular clamping area 47 on the rear face of the mandrel, and a relatively thick central portion 48 into which the outer end of the piston rod 25 is tightly threaded. A central longitudinal passageway 49 extends completely through the mandrel 27 and is in alignment with the passageway 38 in rod 25. In aligned rows therealong, the hub 40 of the body portion is provided with equally spaced radial passages 50 that communicate between passageway 49 and the outside of the mandrel, the arrangement being such that each row of passages 50 is located approximately half way between each adjacent pair of vanes 41.

With the piston rod 25 at the forward limit of its movement (to the left as viewed in Figs. 2 and 3), the mold 10 with roller 13 in engagement therein is manually or mechanically placed in position around the mandrel 27 until it assumes the position shown in Figs. 2 and 3. In reaching this position, the mold 10 is moved longitudinally over the mandrel, the rounded front end 43 of the latter facilitating the entrance of the mandrel into the open end of the roller. As longitudinally movement of the mold and roller continues, the outer face of flange 17 of the roller will engage the tapered surface 45 of tail plate 44 and the flange will be folded inwardly as it moves up surface 45. The greatest diameter of surface 45 is at its outer end and since this diameter is slightly less than the inside diameter of roller 13, the flexibility of flange 17 readily permits its movement in folded condition to a position beyond the outer end of tail plate 44, in which position the flange will unfold. Longitudinal movement of the mold and roller is then reversed for a short distance until the inner face of flange 17 is against the annular area 47 on the rear face of the mandrel and the lip 18 of the flange extends into the cutout 46 of the mandrel. An operator can readily observe when the flange 17 has passed beyond the tail plate 44 so that he can quickly reverse the longitudinal movement of the mold and roller to bring the inner face of flange 17 and the annular area 47 of the mandrel into substantially the abutting engagement shown in Fig. 3.

This abutting engagement of the mandrel face and flange 17 is maintained by the operator, and handle 24 is moved downwardly to its broken line position to admit air to the forward end of cylinder 20 to move the piston rod 25 rearwardly (to the right as viewed in Figs. 2 and 3). As rod 25 moves rearwardly, sleeve 28 mandrel 27 and the mold and roller will also move in the same direction, with the operator holding the mold (during manual operation of the process) so that the engagement between the roller and mandrel is not broken. When the rear end of sleeve 28 engages the packing gland 26, no further movement of the sleeve is possible, but rod 25 will continue its movement through sleeve 28, so as to continue the movement of the mandrel, mold and roller.

Eventually the outer face of flange 17 of the roller will meet the annular area 32 on the front face of sleeve 28, and the flange will become tightly clamped between the two annular areas 47 and 32 on the mandrel and sleeve, respectively, so that an air tight seal will be provided, as indicated in Fig. 5.

Now valve 36 is operated to create a vacuum within the roller 13 and the differential pressure caused by the vacuum will strip the annular wall of the roller, including the decorative design thereon, from engagement with the mold wall and move it inwardly into collapsed engagement with the mandrel 27, substantially as indicated in Figs. 5 and 6. Then, while the vacuum is being maintained, the mold 10 may be quickly and easily pulled longitudinally from around the collapsed roller, and thereafter when the vacuum is released, the roller will return to its original molded shape without any damage to the roller or its surface design.

In connection with the mandrel 27, it should be observed that the distance around the perimeter of the mandrel, taken in any plane passing transversely through the mandrel, is approximately equal to the distance around the inner periphery of the annular wall of the roller, taken in an extension of the same plane, so that as the roller wall is drawn inwardly it will substantially snugly engage the outer surface of the mandrel, as shown in Fig. 6. The length of the mandrel arms or vanes 41 should be such that ample space will be left between the collapsed roller wall and the mold wall, to permit longitudinal removal of the mold 10. Also, while in this instance the mandrel is provided with four arms or vanes, this number could be changed as desired.

While I have shown and described a preferred process and form of apparatus for carrying out my invention, it will be apparent that the invention is not limited thereto, and that changes and modifications may be made therein without departing from the spirit of the invention or from the scope of the subjoined claims.

What is claimed is:

1. A process for stripping a flexible hollow roller having a decorative surface design from an unbroken cylindrical mold in which said design is cut in intaglio and in which said roller is formed, which comprises introducing a perforated multiple-vaned mandrel into said roller, exhausting air from said roller through said mandrel to create a vacuum in said roller to pull the roller wall including said surface design substantially radially inwardly onto said mandrel out of engagement with said mold, the distance around the perimeter of the mandrel taken in a plane passing transversely through the mandrel being approximately equal to the distance around the inner periphery of the annular wall of the roller taken in an extension of the same plane, and longitudinally separating said mold from said roller while said vacuum is maintained.

2. A process for stripping a flexible, hollow roller of rubber-like material having a decorative surface design from a non-sectional cylindrical mold in which said design is cut in intaglio and in which said roller is formed, which comprises introducing a perforated substantially star shaped mandrel into said roller, exhausting air from said roller through said mandrel to create a vacuum in said roller to pull the wall thereof radially inwardly onto the mandrel to separate said roller from said mold, the distance around the perimeter of the mandrel taken in a plane passing transversely through the mandrel being approximately equal to the distance around the inner periphery of the annular wall of the roller taken in an extension of the same plane, and longitudinally separating said mold from said roller while so separated and while said vacuum is maintained.

3. A process for stripping a flexible, hollow roller of resinous material having a decorative surface design from an unbroken cylindrical mold in which said design is cut in intaglio and in which said roller is formed, which comprises removing an end wall of said roller to form an opening affording access to the interior thereof, inserting a perforated substantially star shaped mandrel through said opening into said roller in spaced relation with the annular wall thereof, with the distance around the perimeter of the mandrel taken in a plane passing transversely through the mandrel being approximately equal to the distance around the inner periphery of the annular wall of the roller taken in an extension of the same plane, sealing said mandrel and opening in air-tight relationship, creating a vacuum in said roller through said mandrel to pull said roller wall from engagement with said mold into engagement with said mandrel, and separating said mold from said mandrel while said roller is in engagement with said mandrel.

4. A process for stripping a flexible, hollow vinyl resin roller having a decorative surface design from a non-sectional cylindrical mold in which said design is cut in intaglio and in which said roller is formed, which comprises removing an end wall of said roller to form an opening affording access to the interior thereof, inserting a perforated multiple-vaned mandrel longitudinally through said opening into said roller in spaced relation with the annular wall thereof, with the distance around the perimeter of the mandrel taken in a plane passing transversely through the mandrel being approximately equal to the distance around the inner periphery of the annular wall of the roller taken in an extension of the same plane, sealing said mandrel within said roller in air-tight relationship with said opening, creating a vacuum in said roller through said mandrel to radially collapse said roller wall from engagement with said mold into engagement with said mandrel, and separating said mold longitudinally from said mandrel while said roller is being held in engagement with said mandrel by said vacuum.

5. A process for stripping a flexible, hollow plastisol object from a non-sectional mold in which it is formed, which comprises removing a portion of said object to form an opening affording access to the interior thereof, inserting a perforated non-annular mandrel through said opening into said object in spaced relation to the major portion of the wall of said object, with the distance around the perimeter of the mandrel taken in a plane passing transversely through the mandrel being approximately equal to the distance around the inner periphery of the annular wall of the roller taken in an extension of the same plane, sealing said mandrel and opening in air-tight relation, creating a vacuum in said object though said mandrel to pull the wall of said object from engagement with said mold into engagement with said mandrel, and separating said mold from said mandrel while said object is in engagement with said mandrel.

6. In a process for stripping a flexible, hollow rubber-like object from a non-sectional mold in which said object is formed, the steps of inserting a perforated substantially star shaped mandrel into said object in air-tight relationship with the wall of said object, with the distance around the perimeter of the mandrel taken in a plane passing transversely through the mandrel being approximately equal to the distance around the inner periphery of the annular wall of the roller taken in an extension of the same plane, then creating a vacuum in said object through said mandrel to collapse the major portion of said object inwardly out of engagement with said mold into engagement with said mandrel, and then separating said mold from said mandrel while said object is in engagement with said mandrel.

7. In combination with a mold, means for stripping a flexible hollow object having a decorative pattern thereon from said mold comprising a perforated substantially star shaped mandrel adapted to extend through a wall of said mold into said object in spaced relation to the major portion of the wall of said object with the perforations in said mandrel located between the arms of said star and with the distance around the perimeter of the mandrel taken in a plane passing transversely through the mandrel being approximately equal to the distance around the inner periphery of the annular wall of the object taken in an extension of the same plane, means for forming an air-tight connection between said mandrel and said object, and means for creating a vacuum within said object through said perforations in said mandrel to collapse said object from engagement with said mold into engagement with said mandrel, whereby said mold may be separated from said object while the latter is held in engagement with said mandrel.

8. An apparatus of the character described comprising an elongated mandrel having a longitudinal passageway therethrough and spaced transverse passages communicating with said passageway, a generally annular clamping member secured on one end of said mandrel, a rod secured to the latter end of said mandrel and having a longitudinal passageway communicating with said first passageway but extending only partially through said rod, said rod also having a transverse passage intermediate its ends communicating with the passageway therein, an elongated sleeve mounted on said rod for limited sliding movement along said rod, said sleeve having an enlarged bore intermediate its ends forming a chamber that is always in communication with said transverse passage in said rod regardless of the position of said sleeve on said rod, a second generally annular clamping member carried on one end of said sleeves, means for moving said rod and mandrel relatively of said sleeve to bring said clamping members into clamping relation with each other, and air evacuating means connected with said chamber.

9. An apparatus of the character defined in claim 8 wherein the body of said mandrel is generally star-shaped in cross section with the transverse passages therein being located between the star arms.

10. An apparatus of the character defined in claim 8 wherein the body of said mandrel comprises a hub portion having a plurality of equally spaced vanes extending radially therefrom, said transverse passages in said mandrel being spaced in rows along said hub portion between said vanes.

11. In an apparatus for stripping a flexible, hollow plastisol roller having a decorative surface design from a non-sectional cylindrical mold in which said design is cut in intaglio, wherein said roller has a portion of one end wall cut away to provide an annular flange extending inwardly from its annular wall, the sub-combination of a substantially star shaped mandrel adapted to extend into said roller in spaced relation to the annular wall of said roller and having an annular clamping member on its rear end adapted to engage the inner face of said flange, with the distance around the perimeter of the mandrel taken in a plane passing transversely through the mandrel being approximately equal to the distance around the inner periphery of the annular wall of the roller taken in an extension of the same plane, a rod secured to the rear end of said mandrel and extending axially therefrom, a second annular clamping member mounted on said rod for limited sliding movement along said rod and adapted to engage the outer face of said flange, and means for moving said rod and mandrel relatively of said second clamping member to bring said clamping members together with said flange clamped therebetween.

12. An apparatus for stripping a flexible, hollow plastisol roller having a decorative surface design from an unbroken cylindrical mold in which said design is cut in intaglio, wherein said roller has a portion of one end wall cut away to provide an annular flange extending inwardly from its annular wall, comprising an elongated mandrel extending into said roller in spaced relation to the annular wall of said roller, said mandrel having a longitudinal passageway therethrough and spaced transverse passages communicating with said passageway, a generally annular clamping member secured on the rear end of said mandrel and adapted to engage the inner face of said flange, a rod secured to the rear end of said mandrel and having a longitudinal passageway communicating with said first passageway but extending only partially through said rod, said rod also having a transverse passage intermediate its ends communicating with said passageway therein, an elongated sleeve mounted on said rod for limited sliding movement along said rod, said sleeve having a chamber intermediate its ends that is always in communication with said transverse passage in said rod regardless of the position of said sleeve on said rod, a second generally annular clamping member carried on the forward end of said sleeve and adapted to engage the outer face of said flange, means for moving said rod and mandrel relatively of said sleeve to bring said clamping members together with said flange clamped therebetween, and vacuum means connected with said chamber to create a vacuum in said roller to pull the annular wall thereof out of engagement with said mold wall and into engagement with said mandrel.

13. An apparatus of the character defined in claim 12 wherein the body of said mandrel is generally star-shaped in cross section with the transverse passages therein being located between the star arms.

14. An apparatus of the character defined in claim 12 wherein the body of said mandrel comprises a hub portion having a plurality of equally spaced vanes extending radially therefrom, said transverse passages in said mandrel being spaced in rows along said hub portion between said vanes, the arrangement being such that the distance around the perimeter of the mandrel, taken in a plane passing transversely through the mandrel, is approximately equal to the distance around the inner periphery of the annular wall of the roller, taken in an extension of the same plane.

References Cited in the file of this patent

UNITED STATES PATENTS

| | | |
|---|---|---|
| 1,809,260 | Wilson et al. | June 9, 1931 |
| 2,101,677 | Hagemeyer | Dec. 7, 1937 |
| 2,124,871 | Beal | July 26, 1938 |
| 2,446,281 | Harding | Aug. 3, 1948 |
| 2,547,894 | Treckman | Apr. 3, 1951 |
| 2,562,299 | Crouch | July 31, 1951 |
| 2,672,651 | Smyser | Mar. 23, 1954 |
| 2,735,137 | Miller et al. | Feb. 21, 1956 |
| 2,804,643 | Miller et al. | Sept. 3, 1957 |